Figure 1:
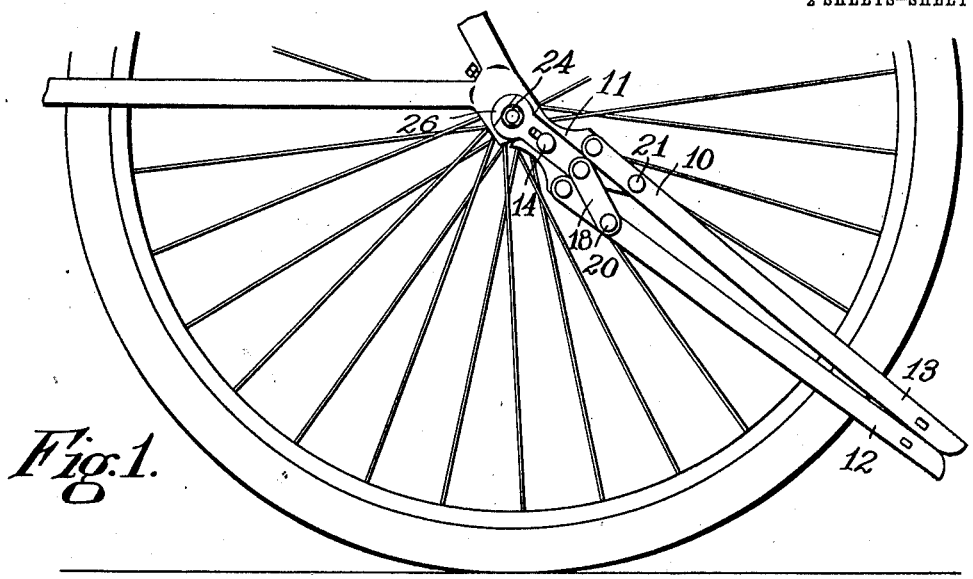

C. A. PERSONS, T. CRABTREE & A. W. DARLING.
BICYCLE STAND.
APPLICATION FILED DEC. 13, 1910.

1,004,190.

Patented Sept. 26, 1911.

2 SHEETS—SHEET 1.

Witnesses
R. D. Tolman.
A. G. Macdonald

Inventors
Charles A. Persons.
Albert W. Darling.
Thomas Crabtree.
By Hartley W. Bartlett
Attorney C. A. PERSONS, T. CRABTREE & A. W. DARLING.
BICYCLE STAND.
APPLICATION FILED DEC. 13, 1910.
1,004,190.
Patented Sept. 26, 1911.
2 SHEETS—SHEET 2.
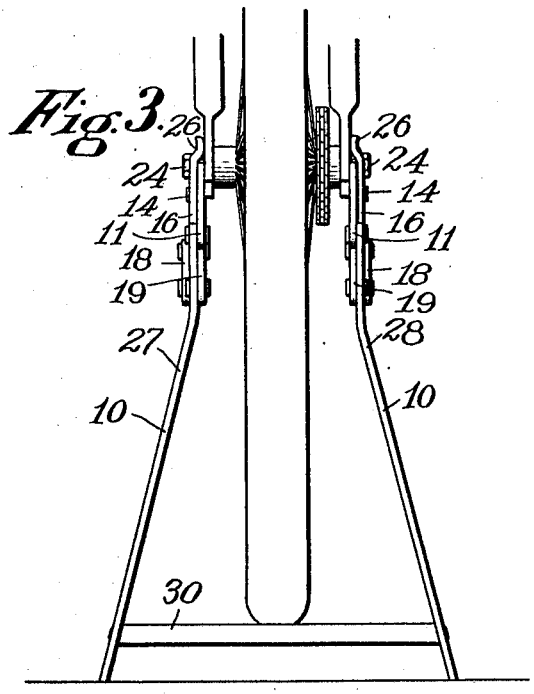
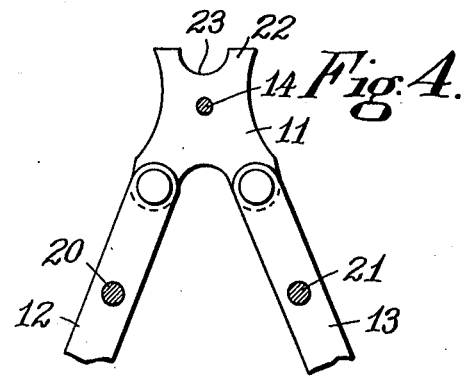
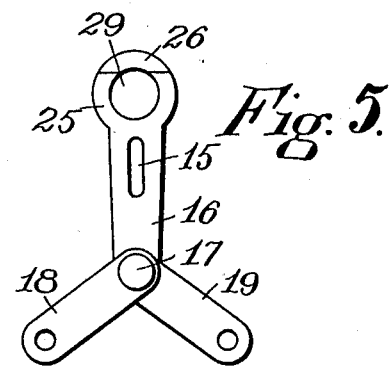
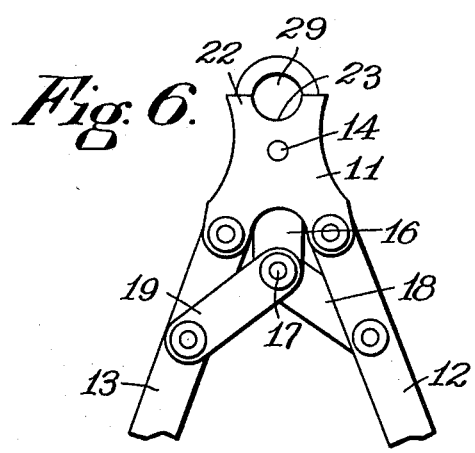
Witnesses
R. D. Tolman.
A. G. Macdonald.
Inventors
Charles A. Persons.
Albert W. Darling.
Thomas Crabtree.
By Hartley W. Bartlett
Attorney

UNITED STATES PATENT OFFICE.

CHARLES A. PERSONS, THOMAS CRABTREE, AND ALBERT W. DARLING, OF WORCESTER, MASSACHUSETTS, ASSIGNORS TO MAJESTIC MANUFACTURING COMPANY, OF WORCESTER, MASSACHUSETTS, A CORPORATION OF MASSACHUSETTS.

BICYCLE-STAND.

1,004,190.         Specification of Letters Patent.     Patented Sept. 26, 1911.

Application filed December 13, 1910. Serial No. 597,106.

*To all whom it may concern:*

Be it known that we, CHARLES A. PERSONS, THOMAS CRABTREE, and ALBERT W. DARLING, citizens of the United States, residing at Worcester, in the county of Worcester, State of Massachusetts, have invented a certain new and useful Improvement in Bicycle-Stands, of which the following is a specification, reference being had therein to the accompanying drawings.

This invention relates to stands for bicycles, motor cycles and the like and has for its object the providing of a simple and efficient device which will be of strong construction and will rigidly grip the bicycle resting thereon.

Heretofore stands of the class of the present invention have generally been provided with U shaped sockets in which the rear axle rests though a very common form is one in which the spreading of the legs closes jaws at the upper extremities of these legs to grip the axle. Such a form would be satisfactory for display purposes but would not hold the bicycle sufficiently firm to permit the same being ridden on the stand.

In the present invention the stand is easily placed upon the axle and an increase in the weight upon the bicycle proportionally increases the grip upon the axle. This is particularly advantageous in the case of motor cycles in permitting the engine to be run upon the stand, for the large amount of jar incidental to such running makes it unsafe to start the engine on the type of stand now in use.

The applicants' device consists preferably of a four legged stand having the legs arranged in opposing pairs connected by braces. For the sake of brevity and clearness, only the portion of the stand supporting one extremity of the rear axle of the bicycle will be described in the specification as the supports of the other extremity are identical except that the parts are reversed.

The numerous features and advantages of this invention will be fully described hereinafter.

One embodiment of the invention is shown in the drawings in which:—

Figure 2:
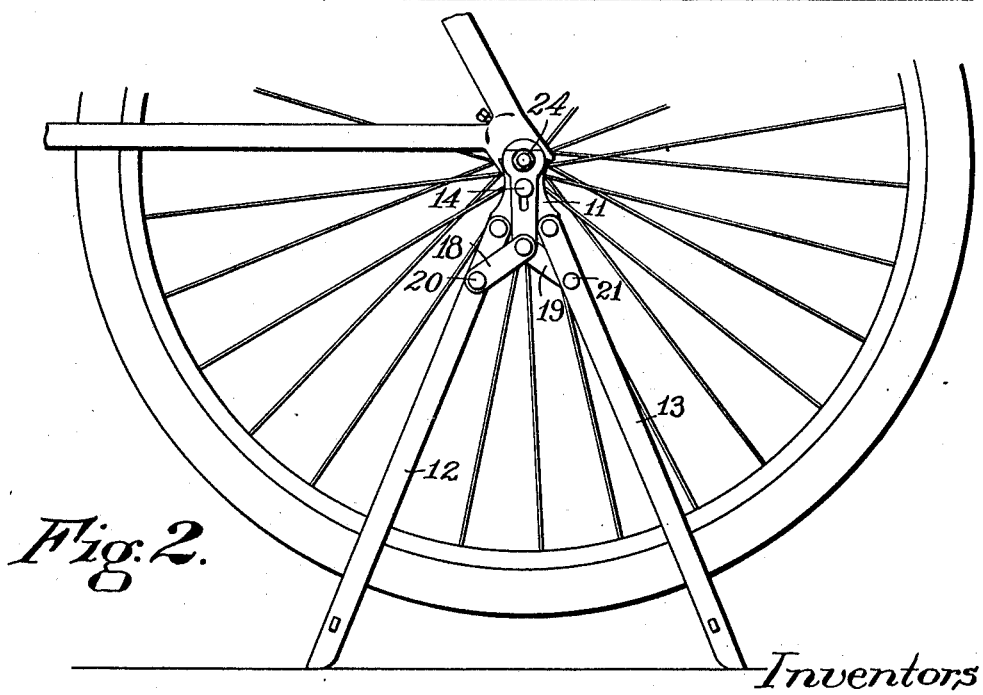

Figure 1 is a front elevation of the invention in the position in which it is placed upon the rear axle, as will be described fully hereinafter. Fig. 2, same as Fig. 1 except that the stand is extended, as will be fully described hereinafter. Fig. 3, same as Fig. 2, side view. Figs. 4 and 5, detail views. Fig. 6, rear view of a portion of stand.

Referring to the drawings:—The stand 10 is provided with a plate 11 upon which are pivoted the two legs 12 and 13. In the plate 11 is set one extremity of a guide-pin 14 which operates in the slot 15 in the sliding plate 16. At the lower extremity of this plate 16 is a pivot pin 17 upon which are rotatably fastened one extremity of each of the links 18 and 19. The other extremities of these links 18 and 19 are pivoted to the legs 12 and 13 respectively by means of the pivot pins 20 and 21.

The top 22 of the plate 11 is cut away to form a semi-circular recess 23 on which the nut 24 upon the rear axle of the bicycle will rest. This nut is the ordinary one found on each extremity of the axle on any bicycle. The upper or ring portion 25 of the sliding plate 16 is bent inward, as is best shown in Fig. 3, so that the top 26 of this portion extends over the recess 23 of the plate 11.

To place the stand upon the bicycle, close the former in the position shown in Fig. 1 and warp apart the portions 27 and 28, as shown in Fig. 3, of the stand until the extremity of the axle will slide within the rings or collars 29. The stand is now in a position to permit the rear of the bicycle to be raised and the stand to be swung into a vertical position. The bicycle should then be lowered until the extremities of the legs strike the ground. The weight of the bicycle will then depress the sliding plate 16, and the supports or legs will be opened or spread by the action of the links 18 and 19 until the nut 24 on the axle rests in the recess 23 upon the top of the plate 11. The weight will still further spread the legs until the top 26 of the collar or ring 29 strikes the top of the nut and binds it in the recess. If the ground is rough or it is otherwise found desirable, the legs or supports may be pushed apart by the operator prior to resting the weight of the bicycle on the stand. The lower extremities of the legs 12 and 13 should preferably be shaped so that they will slide easily upon the floor and cause the stand to open or spread as much as possible. It will thus be seen that the increase in the weight supported by the stand will cause the latter to automatically increase its grip upon the axle.

The recess 23 may be made hexagonal or other shape instead of semi-circular but this is not usually desirable as the nuts used upon the rear axle of different makes of bicycles vary considerable in size.

The construction of the stand is such that it is not necessary to provide additional supports or cross bars to prevent the same from opening or spreading too much. Each pair of opposing legs is preferably connected by a brace 30.

The use of the ring or collar 29 instead of the jaws heretofore used is a distinct advantage as it entirely surrounds the axle and nut and will not come off when the bicycle is tipped.

The applicants have constructed a number of modifications of their mechanism for gripping the axle but they have not deemed it necessary to show more than one embodiment as other forms will readily occur to any one skilled in the art, and for this reason they do not care to be limited to the particular embodiment herein shown and described.

What we claim as our invention and desire to secure by Letters Patent is:—

1. In a device of the class described, the combination of a folding frame and axle bearings, with means connecting said bearings with the members of said frame whereby depression of the bearings causes a corresponding spreading of said members.

2. In a device of the class described, the combination of a folding frame and axle bearings slidably mounted thereon, with means connecting said bearings with the members of said frame whereby depression of the bearings causes a corresponding spreading of said members.

3. In a device of the class described, the combination of a folding frame, and bearings slidably mounted thereon adapted to encircle an axle, with means connecting said bearings with the members of said frame whereby depression of the bearings causes a spreading of said members and locks the axle within the bearings.

4. In a device of the class described, the combination of a folding frame and bearings slidably mounted thereon adapted to encircle an axle, with means connecting said bearings with the members of said frame whereby spreading of the frame members causes the axle to be locked within the bearings.

5. In a device of the class described, the combination of a folding frame, with plates slidably mounted thereon, bearings in said plates adapted to receive and encircle an axle, and means connecting said plates with the members of said frame whereby spreading of the frame members causes said plates to be drawn downward and said axle to be locked within the bearings.

6. In a device of the class described, the combination of a folding frame, with plates slidably mounted thereon, bearings in said plates adapted to receive and encircle an axle, and means connecting said plates with the members of said frame whereby spreading of the frame members causes said plates to be drawn downward and to act in conjunction with the frame to lock the axle within the bearings, said means preventing further spreading of the frame as soon as the axle is locked.

7. In a device of the class described, the combination of a frame comprising front and rear members pivotally connected, with sliding plates mounted on said frame, axle bearings in each of said plates, and links connecting each of these plates with the frame members whereby spreading of said frame members causes the axle to be locked in the bearings.

8. In a device of the class described, the combination of a folding frame, with plates slidably mounted thereon, axle bearings in said plates, and links connecting said plates with the members of said frame whereby spreading of the frame members draws downward said plates and, in conjunction with the frame, locks the axle within said bearings.

9. In a device of the class described, the combination of a folding frame comprising two main plates having supporting frames pivotally mounted thereon, with a plate slidably mounted upon each of said main plates, axle bearings in each of said sliding plates, and links connecting these sliding plates with the supporting frame whereby spreading of the frame members causes said sliding plates to be drawn downward, jamming the axle within said bearings against the top of the main plates and causing it to be locked in said bearings.

10. In a device of the class described, the combination of a folding frame with bearing blocks movably mounted thereon adapted to be slid over the extremities of an axle and to encircle the axle nuts, and means connecting said blocks with said frame whereby spreading of the frame causes said nuts to be locked within said blocks.

In testimony whereof we affix our signatures, in the presence of two witnesses.

CHARLES A. PERSONS.
THOMAS CRABTREE.
ALBERT W. DARLING.

Witnesses:
HARTLEY W. BARTLETT,
AMY G. MACDONALD.

Copies of this patent may be obtained for five cents each, by addressing the "Commissioner of Patents, Washington, D. C."